A. C., J. M., H. E. & A. T. JOHNSON.
TRACTION ENGINE DRIVE WHEEL.
APPLICATION FILED JULY 3, 1908.
909,905.
Patented Jan. 19, 1909.
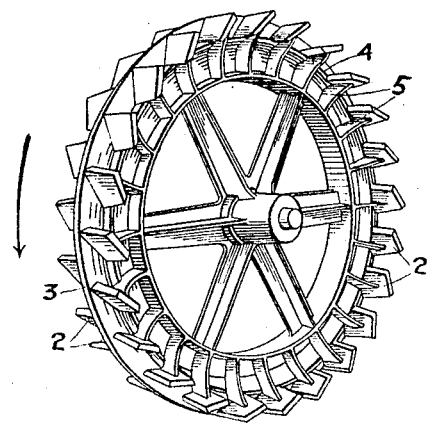
FIG.3
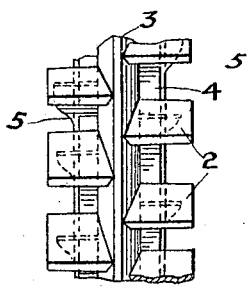
FIG.4
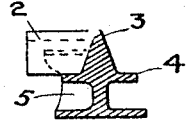
FIG.2
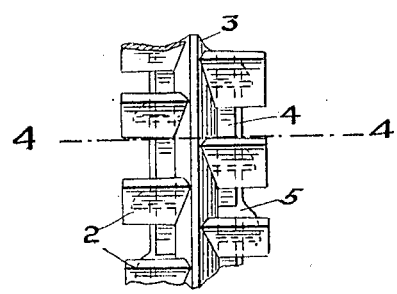
WITNESSES:
Leon Boillot
Charles A Benfield
INVENTORS:
Alfred C. Johnson
John M. Johnson
Henry E. Johnson
August T. Johnson
by Geo. H. Strong
Atty.

UNITED STATES PATENT OFFICE.

ALFRED C. JOHNSON, JOHN M. JOHNSON, HENRY E. JOHNSON, AND AUGUST T. JOHNSON, OF SUNNYVALE, CALIFORNIA.

TRACTION-ENGINE DRIVE-WHEEL.

No. 909,905.      Specification of Letters Patent.      Patented Jan. 19, 1909.

Application filed July 3, 1908. Serial No. 441,768.

*To all whom it may concern:*

Be it known that we, ALFRED C. JOHNSON, JOHN M. JOHNSON, HENRY E. JOHNSON, and AUGUST T. JOHNSON, all citizens of the United States, residing at Sunnyvale, in the county of Santa Clara and State of California, have invented new and useful Improvements in Traction-Engine Drive-Wheels, of which the following is a specification.

This invention relates to drive or traction wheels, and especially such as are used on harvesters, traction engines, and other heavy vehicles.

The object of the invention is to provide a strong, light-weight, integrally constructed wheel, of such design as to have a maximum tractive capacity, and to provide a wheel which shall be self-cleaning.

Our invention consists of the parts and the construction and combination of parts as hereinafter more fully described and claimed, having reference to the accompanying drawings, in which—

Figure 1 is a perspective of the device. Fig. 2 is a face view of a portion of the wheel. Fig. 3 is a back view of a portion of the wheel. Fig. 4 is a cross-section along line 4—4 of Fig. 2.

In the embodiment of the invention, as actually constructed and applied, we use a series of spaced, flat-faced, inclined, successive treads 2, arranged circumferentially about the wheel rim 3. Preferably there are two circumferential series of these tread sections 2, arranged in staggered formation, with a series on each side of the peripheral web 4; which latter and the treads and rim are all preferably cast integral. The treads are so placed that those on one side are alternate to those on the opposite side; *i. e.*, when a tread is presented on one side of the rim there is a space in the same plane adjacent the tread on the opposite side, so that there is in effect a continuous bearing surface to prevent the wheel sinking too deep into the ground. The tread sections when viewed edgewise have their faces nearly tangential to rim 3, and these faces form a continuous zigzag tread, with the intervening, outwardly flared spaces between the tread sections allowing and aiding any mud or debris that may be carried up during the rotation of the wheel to be readily dislodged and to drop off clear of the wheel. The self-cleaning feature of this wheel is an important advantage over all traction wheels of which we have knowledge. The treads 2 project from the rim 3 at right angles to the plane of the wheel, and are stiffened by radial ribs or brackets 5 connecting with the web flange extending outward from the rim.

An important feature of the wheel is the inclined arrangement of the sections 2, forming in effect claws or toes to push back against the earth in pulling the load; at the same time, the sections provide practically a continual peripheral tread on the wheel to support its weight and the weight of the engine or vehicle to which it may be applied. The sections 2 have the combined function of a continuous supporting tread and of tractive growsers. The edgewise standing web 5 is also advantageous in preventing sidewise slipping or sliding, as well as increasing the strength of the wheel.

It will thus be seen that we provide a strong, rigid wheel with maximum tractive capacity, as compared with the ordinary rimmed wheel with its small, shallow growsers, since these latter wheels present only a line-contact with the ground; whereas the treads used in our invention present flat bearing and pushing surfaces, and moreover, the periphery of our wheel is self-cleaning and will not become clogged, as found by actual and practical test.

The wheel presents a flat lifting surface to the ground so that it rolls with little loss of power, for the reason that it does not roll the ground down, causing a rise in front, like the ordinary wheel.

The web 4 being preferably triangular in cross-section, as shown in Fig. 4, assists materially in clearing the wheel of stuff which might otherwise stick to it and be carried on over by the wheel.

Having thus described our invention, what we claim and desire to secure by Letters Patent is—

1. A wheel having a tread portion formed of a series of successively-arranged, circumferentially-disposed rigid tread sections each having a wide flat surface inclined relative to the circumference of the wheel.

2. A wheel having a tread portion made up of a series of successively-arranged, circumferentially-disposed, wide flat tread sections all inclined in the same general direction around the wheel relative to the circumference thereof.

3. A wheel having a rim provided with a peripheral, central, annular flange or web, and spaced tread members on each side of the web and having broad flat surfaces inclined relative to the periphery of said flange.

4. A wheel having a rim provided with a peripheral, central, annular flange or web, and spaced tread members on each side of the web each having a broad, flat, surface inclined relative to the periphery of the web, said tread members on each side of the web being staggered with respect to those of the other side.

In testimony whereof we have hereunto set our hands in presence of two subscribing witnesses.

ALFRED C. JOHNSON.
JOHN M. JOHNSON.
HENRY E. JOHNSON.
AUGUST T. JOHNSON.

Witnesses:
GEORGE E. BROWNING,
A. H. LAWRENCE.